United States Patent
Lee et al.

(10) Patent No.: US 7,377,964 B2
(45) Date of Patent: May 27, 2008

(54) DEVICE FOR PROCESSING DISCHARGING EXHAUST GAS

(75) Inventors: Ching-Tien Lee, Hsin-Chu Hsien (TW); Wei-Jen Mai, Hsin-Chu (TW)

(73) Assignee: Powerchip Semiconductor Corp., Science Park, Hsin-Chu (TW)

( * ) Notice: Subject to any disclaimer, the term of this patent is extended or adjusted under 35 U.S.C. 154(b) by 336 days.

(21) Appl. No.: 10/908,774

(22) Filed: May 25, 2005

(65) Prior Publication Data
US 2006/0130660 A1 Jun. 22, 2006

(30) Foreign Application Priority Data
Dec. 16, 2004 (TW) .............................. 93139225 A

(51) Int. Cl.
*B01D 53/04* (2006.01)
(52) U.S. Cl. ...................................... 96/146
(58) Field of Classification Search ................. 96/108, 96/112, 143, 146; 95/114, 115, 143, 148
See application file for complete search history.

(56) References Cited

U.S. PATENT DOCUMENTS

| | | | | |
|---|---|---|---|---|
| 4,231,764 A | * | 11/1980 | Mattia | 95/109 |
| 4,409,006 A | * | 10/1983 | Mattia | 95/113 |
| 4,784,836 A | * | 11/1988 | Karlsson et al. | 422/175 |
| 4,966,611 A | * | 10/1990 | Schumacher et al. | 95/18 |
| 4,986,836 A | * | 1/1991 | Tandon | 96/111 |
| 5,176,798 A | * | 1/1993 | Rodden | 202/159 |
| 5,198,001 A | * | 3/1993 | Knebel et al. | 95/141 |
| 5,941,073 A | * | 8/1999 | Schedler et al. | 60/687 |
| 6,666,911 B2 | | 12/2003 | Chou et al. | |
| 2003/0019359 A1 | * | 1/2003 | Shah et al. | 95/123 |

FOREIGN PATENT DOCUMENTS

TW 493056 7/2002

\* cited by examiner

*Primary Examiner*—Frank M Lawrence
(74) *Attorney, Agent, or Firm*—Winston Hsu

(57) ABSTRACT

The present invention provides equipment for processing discharging exhaust gas. The equipment comprises an adsorption system, an incinerator, an exhaust connected to the incinerator, a first heat heat exchanger connected between the adsorption system and the incinerator, a windmill that has a first piping in the inlet and a second piping in the outlet, and a pipe connected between the adsorption system and the first piping. The equipment for processing discharging exhaust gas can effectively save energy and decrease costs.

18 Claims, 3 Drawing Sheets

DEVICE FOR PROCESSING DISCHARGING EXHAUST GAS

BACKGROUND OF INVENTION

1. Field of the Invention

The invention relates to equipment for processing discharging exhaust gas, and more particularly, to enhance the desorbed effect of a volatile organic compounds (VOC) abatement system.

2. Description of the Prior Art

As high-tech products trend to higher quality, trace particles or impurities influence the yield and reliability of the products as well as the health of the laborer. Therefore, whether protecting the environment, the laborer safety issues, or product competitiveness is to be regarded, it is important that air-pollution and exhaust gas cannot neglected.

Most exhaust gases in semiconductor processing are volatile organic gases, or inorganic acid or alkali gases having large volume (>50,000 $m^3$/hr) and low concentration (<500 ppm $CH_4$). Therefore, now most industries use a VOC abatement system. For example, Taiwan Patent 00493056 discloses a discharging exhaust gas equipment system for dealing with large volume and low concentration VOCs. This discharging exhaust gas equipment applies two technologies: one is adsorption concentration by utilizing Zeolite or active carbon to absorb VOC gases, and another is oxidization combustion for burning the high concentration pernicious gases produced from desorbing the saturated Zeolite and active carbon having high concentration VOC gases. However, while utilizing a desorbed and oxidization combustion process, the system needs a high temperature to be effective. For example, the needed temperature is at least 150~180° C. in the desorbed process, and the required combustion temperature needs to be at least 760° C. in the oxidization combustion process. Therefore, in the interest of saving energy and cost, some heat exchangers are added into abatement systems to enhance the temperature of desorbed and oxidization combustion processes.

However, the size and the efficiency of the heat exchanger will influence the exchanged temperature. If the exchanged temperature is not high enough, in the long-term the Zeolite and active carbon cannot obtain the desorbed temperature resulting in the efficiency of the VOC abatement system and the burned exhaust gases being decreased. Therefore, the heat exchangers should be renovated to enhance the efficiency, or temperature of the incinerator should be increased. However, needed methods incur too high of a cost and building the equipment is too difficult, so that the goal of saving cost and energy cannot be attained.

SUMMARY OF INVENTION

It is therefore a primary objective of the present invention to provide a discharging exhaust gas equipment having better desorbed effect to solve the above-mentioned problem.

According to the claimed invention, the equipment includes an adsorption system, an incinerator, an exhaust connected to the incinerator, a first heat exchanger connected to and between the adsorption system and the incinerator, a blower having an inlet and an outlet, a first piping in the inlet, a second piping in the outlet, and a pipe connected between the adsorption system and the first piping.

The discharging exhaust gas equipment can enhance the inlet temperature of the blower for making outside gas going through the heat exchanger to attain desorbed temperatures that can effectively desorb the VOCs adsorbed by the adsorption system. In addition, the discharging exhaust gas equipment even does not require a second heat exchanger to achieve the same efficiency as prior art. The discharging exhaust gas equipment can save initial equipment cost and maintenance equipment cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
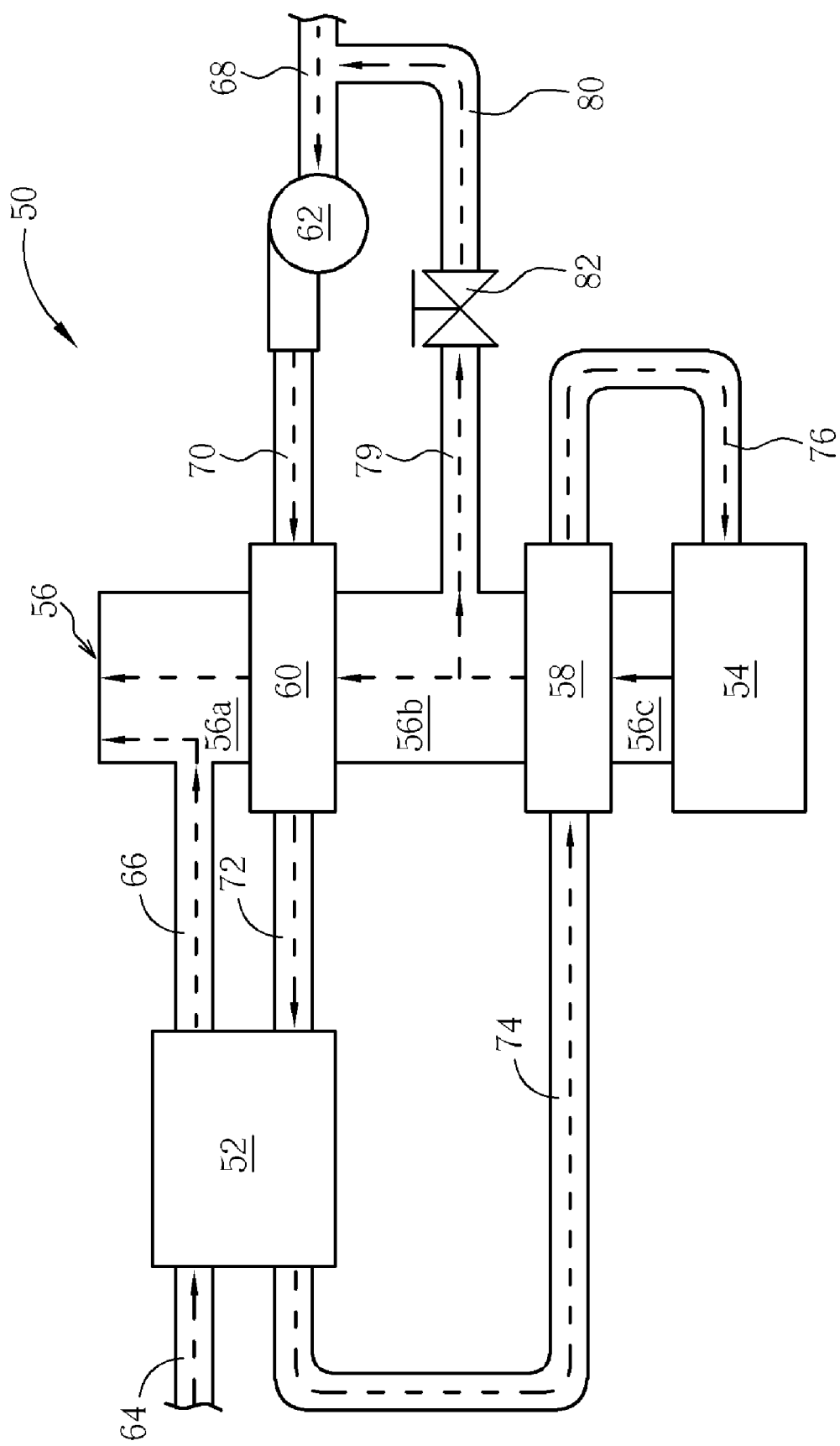
FIG. 1 is a schematic diagram of equipment for processing discharging exhaust gas according to the present invention.
Figure 2:
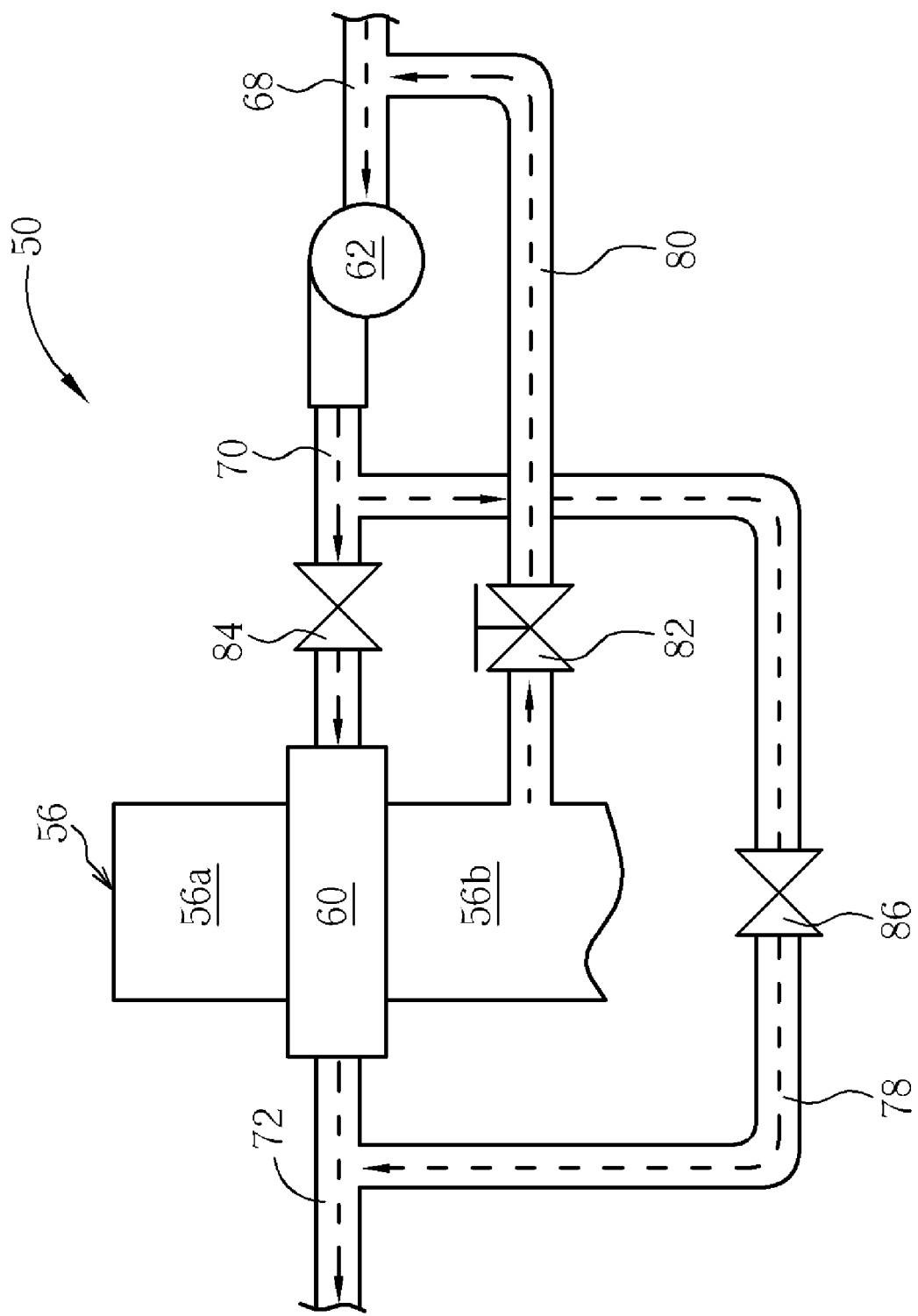
FIG. 2 and FIG. 3 are partial magnifying schematic diagrams of equipment for processing discharging exhaust gas according to the present invention.
Figure 3:
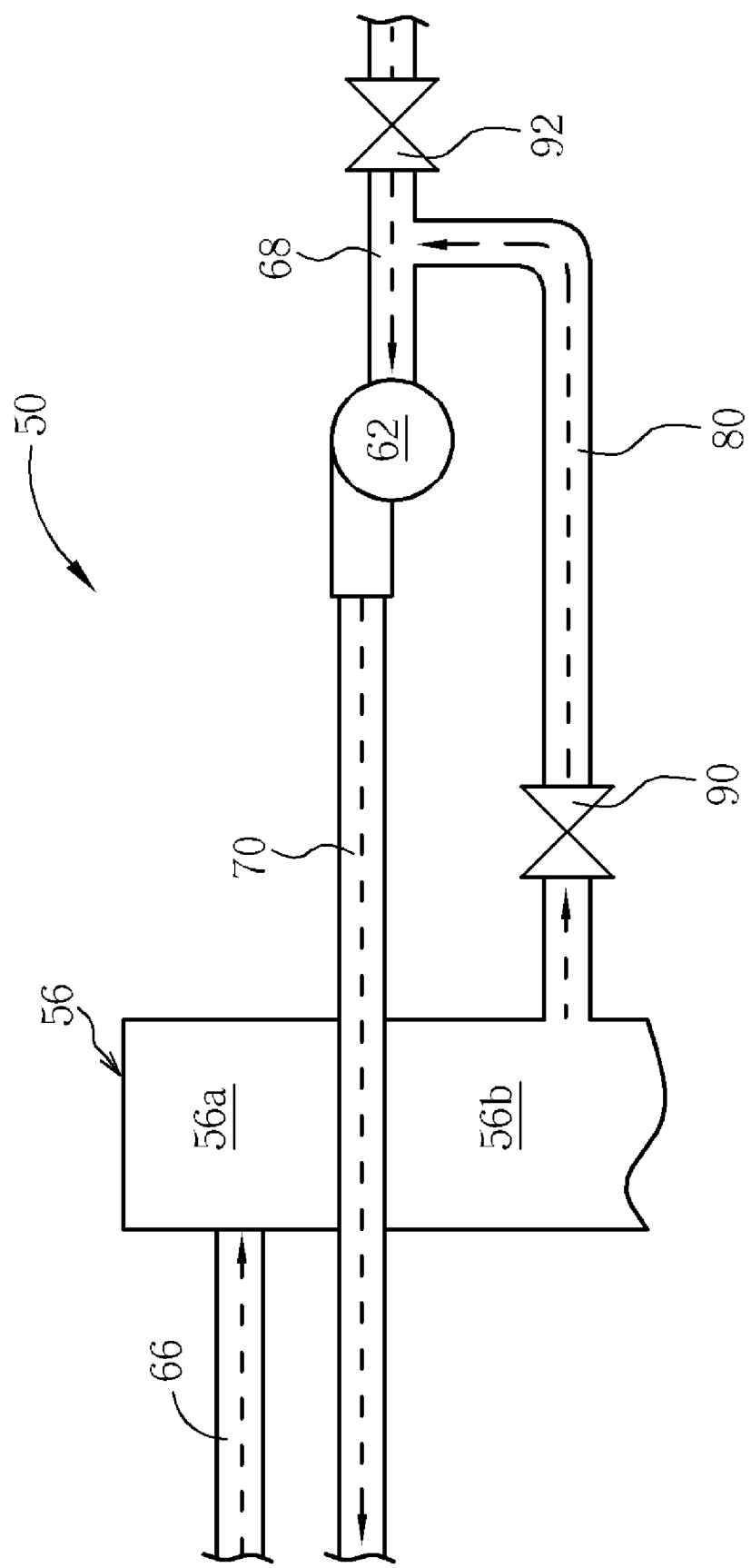

Please refer to FIG. 1 to FIG. 3 that are equipment for processing discharging exhaust gas according to the present invention. The discharging exhaust gas equipment 50 includes an adsorption system 52, an incinerator 54, an exhaust 56 connected to the outlet of the incinerator 54, a first heat exchanger 58, a second heat exchanger 60, a blower 62, a plurality of piping 64, 66, 68, 70, 72, 74, 76, 78, 79 and a pipe 80. The adsorption system 52 can be a Zeolite concentrator or an active carbon adsorption system, and the exhaust 56 is the combination of top pipe 56a, middle pipe 56b, and lower pipe 56c.

As shown in FIG. 1, the first piping 64 is deposited on the inlet of the adsorption system 52, for making the lower concentration VOCs enter into the adsorption system 52 and be adsorbed by the adsorption system 52. The second piping 66 is deposited on the outlet of the adsorption system 52 and connected to the exhaust 56. After the VOCs in the first piping 64 enter into adsorption system 52, the VOCs are adsorbed and become clear exhaust gases. Ninety percent of the clear exhaust gases is passed through the second piping 66 and the exhaust 56 and discharged to air, and the other 10 percent of those clear exhaust gases is conducted into the blower for mixing with outside gases.

In addition, the third piping 68 and the fourth piping 70 are respectively deposited on the inlet and outlet of the blower 62, and the fourth piping 70 additionally is connected to the second heat exchanger 60. After the outside gases, such as air, go through the third piping 68, the outside gases are delivered to the fourth piping 70 by the blower 62 and through the second heat exchanger 60 to process heat exchange for enhancing the gases temperature before entering the adsorption system 52 and to desorb the VOCs adsorbed in the Zeolite concentrator or active carbon adsorption system. The fifth piping 72 is connected between the adsorption system 52 and the second heat exchanger 60. The outside gases are heated by the second heat exchanger 60 and go through the fifth piping 72 and enter the adsorption system 52, for enhancing the temperature of the adsorption system 52 and desorbing the adsorbed VOCs in the adsorption system 52 to form the high concentration VOCs.

Moreover, the high concentration VOCs will be delivered through the sixth piping 74 to the first heat exchanger 58 to proceed with another heat exchange, for enhancing the temperature of high concentration VOCs. Finally, the heated high concentration VOCs pass through the seventh piping 76 and enter into the incinerator 54 to be burned, and then go through the exhaust 56 into the air. Because the oxidization combustion needs extremely high temperatures of about 760° C. to burn the high concentration VOCs, the present invention utilizes first heat exchanger 58 to enhance the temperature of high concentration VOCs, saving the incinerator 54 energy.

However, if the second heat exchanger of prior art is of bad design or the second heat exchanger is obstructed to cause the desorbed temperature is not high enough, the VOCs in the adsorption system 52 cannot he completely desorbed and seriously, influence the adsorbed efficiency of the adsorption system 52. Therefore, the present invention utilizes the pipe 80 to connect between the ninth piping 79 and the third piping 68, and a first valve 82 for promoting the temperature of delivered outside gases through the fifth piping 72 to attain and maintain the required 180~300° C. desorbed temperatures in the adsorption system 52, so the desorbed temperature in adsorption system 52 is maintained 180~250° C. to effectively desorb the VOCs adsorbed in the Zeolite concentrator and the active carbon adsorption system. Besides, the temperature of VOCs burned by the incinerator 54 is about 760° C. so that the temperature of the gases passing through the middle exhaust 56*b* is still about 300° C. Thus, the present invention utilizes a few burned VOCs through the pipe 80 and the first valve 82 to the third piping 68 to enhance the beginning temperature of gases entering the blower 62 by at least 50° C., from 30° C. to 80° C., so that the outside gases passing through the second heat exchanger 60 is warmed to a higher temperature that can be controlled to be 180~300° C. So, the desorbed temperature in adsorption system 52 is maintained 180~250° C. to effectively desorb the gases. By pre-heating the outside gases, the pipe 80 can make the VOCs adsorbed in the adsorption system 52 be desorbed completely according to the present invention.

It is to be noted that utilizing the combination of the piping and the ratio valve can effectively control the temperature of the gases entering into the adsorption system 52. FIG. 2 is a partial magnifying schematic diagram of equipment 50 for processing discharging exhaust gas according to the present invention. The pipe 80 includes a first valve 82, and temperature control manual valve is preferred for controlling the amount of VOCs entered the third piping 68. A first ratio valve 84 and a second ratio valve 86 deposited on the fourth piping 70 and the eighth piping 78 respectively, for controlling the gases temperature. Moreover, after the mixed gases going through the third piping 68 and the pipe 80 pass the blower 62, if the temperature of the gases is too high, the first ratio valve 84 is used to control the amount of VOCs entering the second heat exchanger 60, rerouting the gases through the eighth piping 78 to the fifth piping 72, decreasing the temperature of gases before entering the second heat exchanger 60. For example, when the temperature of the gases through the blower 62 is 100° C., then the temperature of the gases passing the second heat exchanger 60 is 230~250° C. However, the desorbed temperature only needs to 150~180° C., so the first ratio valve 84 is utilized to control a 60~80 percent amount of the gases entering the second heat exchanger 60 and another 40~20 percent amount of the gases going through the eight piping 78 to the fifth piping 72 to decrease the temperature of the gases passing the second heat exchanger 60. The first and second ratio valves 84, 86 are ratio automatic valves.

It is to be more noted that above-mentioned the VOCs burned by the incinerator 54 go through the middle exhaust 56*b* to the pipe 80 and third and fourth ratio valves 90, 92 are deposited on the pipe 80 and the second piping 68 respectively as shown in FIG. 3. Because the temperature of the gases in middle exhaust 56*b* is at least 300° C., the temperature of gases can be controlled by the blower 62 and the third and the fourth ratio valves 90, 92. If the temperature of the gases is too low, the third ratio valve 90 is turned on more and the fourth ratio valve 92 is turned off more. On the other hand, if the temperature of the gases is too high, the third ratio valve 90 is turned off more and the fourth ratio valve 92 is turned on more, so that the temperature can be automatic adjusted. In addition, a filter (not shown) can be added to the fourth piping 70 for sieving out particles. Thus, the second heat exchanger 60 can be abrogated so that the cost of the equipment is decreased. The third and the fourth ratio valves 90, 92 are ratio automatic valves.

To sum up, the present invention equipment for processing discharge exhaust gases encompasses the following advantages: the designed equipment not only improves the temperature of the gases, but also substantially completely desorbs the VOCs adsorbed in the adsorption system. In addition, valves are appropriately applied to control the amount of gases entering the blower in the present invention equipment so that the equipment does not require the second heat exchanger of prior art. Therefore, the present invention equipment can substantially save equipment and maintenance costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for processing discharge exhaust gases, the device comprising:
   an adsorption system;
   an incinerator;
   an exhaust connected to the incinerator;
   a first heat exchanger connected between the adsorption system and the incinerator;
   a blower having a first piping connected to an inlet of the blower and a second piping connected to an outlet of the blower and the adsorption system;
   a second heat exchanger connected to the second piping of the blower and the adsorption system, wherein the first heat exchanger and the second heat exchanger are coupled in series;
   a pipe connected to the exhaust and the first piping;
   a first valve coupled to the first piping of the blower via the pipe; and
   a middle exhaust coupled to the pipe via the first valve, wherein the gases are exiting the middle exhaust through the pipe.

2. The device of claim 1, wherein the exhaust gases comprise volatile organic compounds (VOCs).

3. The device of claim 1, wherein the adsorption system is a Zeolite concentrator.

4. The device of claim 1, wherein the adsorption system is an active carbon adsorption system.

5. The device of claim 1, wherein the first valve controls the amount and the temperature of gases entering the first piping.

6. The device of claim 5, wherein the first valve is a manual valve.

7. The device of claim 1 further comprising a third piping, a fourth piping, a fifth piping, and a sixth piping, wherein the third piping is for delivering the exhaust gases into the adsorption system and the gases are adsorbed, the fourth piping is for delivering adsorbed clear exhaust gases into the exhaust, the fifth piping connects to the adsorption system and the first heat exchanger, and the sixth piping connects to the first heat exchanger and the incinerator.

8. A device for processing discharge exhaust gases, the device comprising:
- an adsorption system;
- an incinerator;
- an exhaust connected to the incinerator;
- a first heat exchanger connected to the adsorption system and the incinerator;
- a blower having a first piping connected to an inlet of the blower and a second and third piping connected to an outlet of the blower, wherein the third piping is connected to the adsorption system;
- a second heat exchanger connected to the second piping and the adsorption system, wherein the first heat exchanger and the second heat exchanger are coupled in series; and
- a pipe connected to the exhaust and the first piping;
- a first valve coupled to the first piping of the blower via the pipe; and
- a middle exhaust coupled to the pipe via the first valve, wherein the gases are exiting the middle exhaust through the pipe.

9. The device of claim 8, wherein the exhaust gases comprise volatile organic compounds (VOCs).

10. The device of claim 8, wherein the adsorption system is a Zeolite concentrator.

11. The device of claim 8, wherein the adsorption system is an active carbon adsorption system.

12. The device of claim 8, wherein the first valve controls the amount and temperature of gases entering the first piping.

13. The device of claim 12, wherein the first valve is a manual valve.

14. The device of claim 8, wherein the second piping of the blower comprises a first ratio valve.

15. The device of claim 14, wherein the first ratio valve is an automatic valve for controlling temperature of desorbed gases.

16. The device of claim 14, wherein the third piping comprises a second ratio valve.

17. The device of claim 16, wherein the second ratio valve is an automatic valve for controlling temperature of desorbed gases.

18. The device of claim 8 further comprising a fourth piping, a fifth piping, a sixth piping, and a seventh piping, wherein the fourth piping is for delivering the exhaust gases into the adsorption system and the gases are adsorbed, the fifth piping is for delivering the adsorbed clear exhaust gases into the exhaust, the sixth piping connects to the adsorption system and the first heat exchanger, and the seventh piping connects to the first heat exchanger and the incinerator.

* * * * *